Feb. 28, 1939.　　　W. I. SENGER　　　2,148,779
MACHINE TOOL HOLDER
Filed June 29, 1936　　　2 Sheets—Sheet 1

INVENTOR
Werner Irving Senger
BY Fred A. Parsons
ATTORNEY

Feb. 28, 1939. W. I. SENGER 2,148,779
MACHINE TOOL HOLDER
Filed June 29, 1936  2 Sheets-Sheet 2

INVENTOR
Werner Irving Senger
BY Fred A. Parsons
ATTORNEY

Patented Feb. 28, 1939

2,148,779

UNITED STATES PATENT OFFICE 2,148,779

MACHINE TOOL HOLDER

Werner Irving Senger, Madison, Wis., assignor to Gisholt Machine Company, Madison, Wis., a corporation of Wisconsin Application June 29, 1936, Serial No. 87,845

22 Claims. (Cl. 29—49)

This invention relates to machine tools, and more particularly to improvements in operating and locating means for indexible tool holders for lathes.

A purpose of the invention is to provide a machine tool with improved means for indexing and accurately locating and clamping indexible members, in which the positions and movement of the manual operating elements are such as to be operated most conveniently and effectively by an operator when in his normal operating position, and with least danger to the operator from the moving elements of the machine, particularly for indexible lathe tool holders.

A further purpose is to provide such a structure in an improved form in which the movement of a single lever initiates and completes the indexing.

A further purpose is to provide an indexing structure, particularly for machine tools, in which the indexible member may be released, indexed and clamped in a sequence of operations derived from movement of a single lever and in which a series of lever movements will effect a predetermined series of positions of the indexible member, but in which the indexible member in certain positions of the lever movement is free to be manually independently indexed or positioned in any desired position of its index movement, whereby to effect the previously mentioned series of index positions, or any other series of positions, or to effect any desired position of the indexible member at any intermediate point in any series.

A further purpose is to provide an improved tool post indexing means of a form and construction to be used on the longitudinally movable cross slide of a lathe with minimum interference on the one hand with the chuck or work pieces carried by the lathe spindle and on the other hand with structure such as is required, for instance, by a longitudinally movable tool turret and with minimum interference with tools carried by such a turret.

A further purpose is generally to simplify and improve the construction and operation of means for locating and clamping indexible machine tool members and particularly for the indexible tool posts of lathes, and more particularly with respect to the structure of the co-pending application Serial No. 42,848, filed September 30, 1935.

The invention consists of the structure herein illustrated, described, and claimed, and in such modifications of the structure illustrated and described as are equivalent to the structure claimed.

In the specification the same reference characters have been applied to the same parts throughout, and in the drawings.

Figure 1:
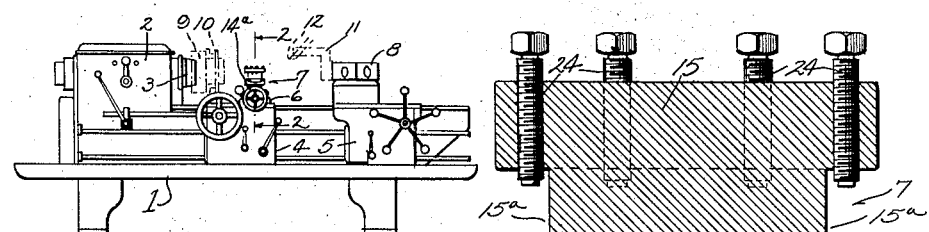
Figure 1 is a front elevation of a lathe incorporating the invention.

The machine shown in Fig. 1 is a lathe which includes a bed 1, a headstock 2 providing transmission and control mechanism for a spindle 3 rotatably mounted therein, a cross slide carriage or support 4 and a turret carriage or support 5 are each guided on bed 1 for movement parallel with the axis of the spindle 3. The carriage 5 guides a cross slide 6 upon which is mounted an indexible tool post generally denoted by the numeral 7 for movement transverse to the axis of spindle 2. The carriage 5 carries a turret device 8. Fixed on the carriage end of spindle 2 is a chuck or work holder 9 in which work pieces such as 10 may be removably clamped.

Turret tool holders such as 11, carrying tools such as 12 are frequently used in this type of lathe, and in order for tool 12 to operate on work piece 10 without undue overhanging and loss of rigidity both the carriages 4 and 5 must be moved to the left in Fig. 1 to a position where there is very little space available for slide 6 and tool post 7 between the chuck 9 and carriage 5. It is also evident that, unless tool post 7 is to be moved far to front or rear each time the tool 12 is brought forward into contact with the work piece, the tool post 7 must be kept sufficiently low for the turret tool 12 to pass over it to reach the work piece 10. Such considerations, and others, indicate that tool post 7 and its associated mechanism should be confined within a space as narrow as may be possible from left to right, Fig. 1, and to project as little as possible above the center of spindle 3.

Furthermore the safety of the operator requires that any operating devices for the post 7 shall not require the entry of the operator's hands into the zone to the left, in Fig. 1, of the slide 6 and tool post 7. Otherwise, since the tool post 7 during its operation is ordinarily brought close to the work piece 10 and chuck 9, in order to reduce tool overhang, the operator's hands might be caught and damaged by the revolving work or chuck.

In the machine here shown various defects of previous machines, in the matters just mentioned, and in other matters, have been overcome similarly to the co-pending application previously referred to, and in addition the structure is such as to provide still greater safety for the operator, since it is no longer necessary for him to reach into the working zone to index the turret, this effect being produced by the manipulation of the same handle which clamps and releases the turret.

Figure 4:
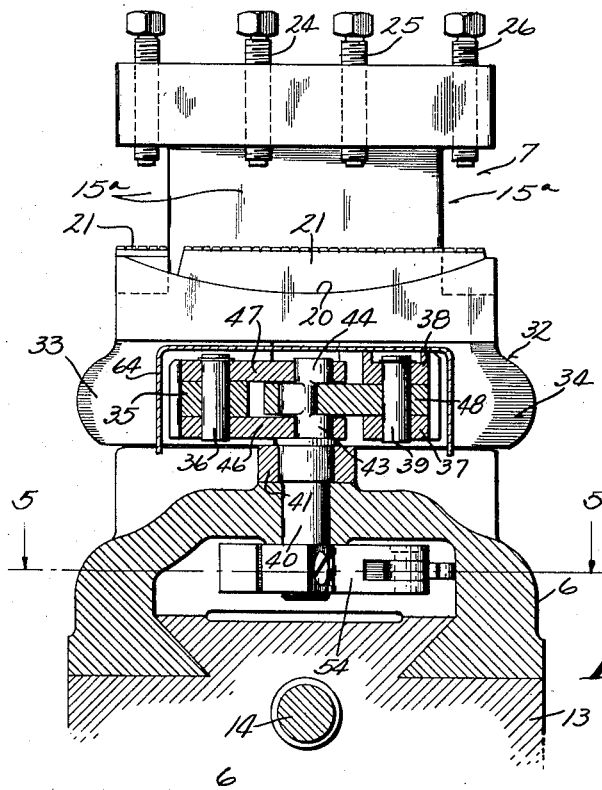
Figure 4 is a vertical section taken approximately along line 4—4 of Fig. 3.

The cross slide 6 is mounted on a portion 13, Fig. 4, of carriage 4, which bridges between front and rear carriage guides or slides on the bed, and the slide 6 is operated by the means of a screw 14, journaled in slide 6 and engaging a suitable nut, not shown, fixed with carriage 5, there being a hand wheel 14a, Fig. 1, fixed on screw 13 at the front of the carriage. Both the slide 6 and the bridge portion 13 are relatively narrow in the direction of the spindle axis, as shown in Fig. 4, for the reasons previously discussed.

Figure 2:
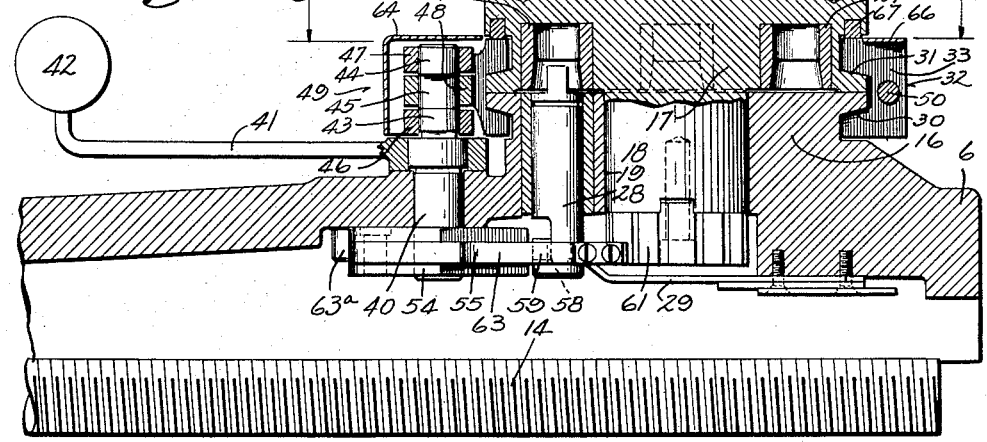
Figure 2 is an enlarged transverse vertical section of the indexible tool post of the lathe shown in Fig. 1, and of a portion of its supports, taken approximately along the line 2—2 of Fig. 2.

The tool post 7 and its operating mechanism is carried by slide 6 for bodily movement therewith, and includes the following structure:

A block member 15 is mounted for rotation on slide 6, the slide providing an annular post support portion 16, Fig. 2, slightly elevated above the top surface of the slide, in supporting contact with a corresponding annular bottom portion 17 of block 15, the block providing a pivot pin portion 18 rotatably engaging a bore 19 in the slide 6, the bore and pin being co-axial with the annular supporting surfaces.

The block 15 provides a plurality of tool holding slots, in this instance four, each similar to the slot 15a, Figs. 2, 4, and each providing a bottom surface, such as 20, of circular segmental form, in which are supported tool rests such as 21, having screws such as 22, which may be advanced for the end of the screw to enter locating holes such as 23, whereby to locate the rests 21 with the top surface thereof in a horizontal plane. The screws 22 may also be retracted to permit the tool rests 21 to assume an angular position whereby to raise or lower the cutting point of a tool resting thereon. Associated with each of the slots 15a are three screws such as 24, 25, 26 for clamping suitable tools in the slots.

The tools, not shown, held in the different slots 15a are successively rotated with the block 15 into operating positions where the slot of the tool to be used is on the side adjacent spindle 2, and at right angles to the axis of the spindle. In each such position the block 15 must be very accurately located in order that successive work pieces shall not vary in size, and rigidly clamped to prevent chatter or vibration.

To locate block 15 there are provided locating bushings, such as 27, suitably spaced, and engageable by a plunger 28 normally urged in engaged direction by a spring 29, Fig. 2, of the flat or cantilever type. The plunger 28 is movable for disengagement by means later described.

To clamp block 15 in the various positions of rotation determined by plunger 28 clamp means are provided as follows:

The annular portions 16, 17 are respectively provided with annular clamp surfaces 30, 31, Fig. 2. Both these surfaces are simultaneously engageable by surfaces complementary thereto on a clamp ring device generally denoted by the numeral 32, and which includes a plurality of members or portions 33, 34, Fig. 3.

The surfaces 30, 31 and the complementary surfaces of ring 32 are formed to co-operate to force the block 15 downward against the face of slide portion 16 when the split ends of the ring 32 are forced together to contract the ring diameter, and to release the block for rotation when the ring is expanded.

The ring 32 is split at the side in the direction of the hand wheel 14a at the front of the machine, and the ring member 33, at its split end, has fixed thereon a lug 35 carrying a pivot pin 36. The ring member 34 similarly has fixed thereon a plurality of spaced lugs 37, 38 carrying a pivot pin 39.

Figure 3:
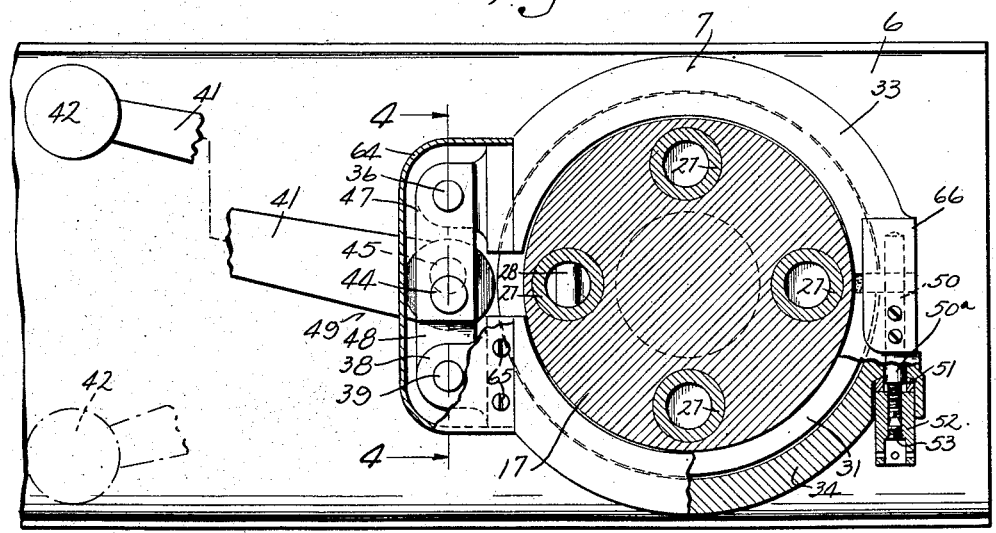
Figure 3 is a partial horizontal section taken approximately along line 3—3 of Fig. 2.

A vertical shaft 40 has fixed thereon a manually operable lever 41 having a hand grip portion 42 which swings about the shaft axis, and the shaft is provided at its upper end with two spaced co-axial portions 43, 44 each correspondingly eccentric to the axis of shaft 40, as indicated in Fig. 3, and with an intermediate portion 45 similarly but oppositely eccentric to the shaft axis. The co-axial eccentric portions 43, 44 are pivotally engaged by the one end of links 46, 47 which at the other end engage the pivot pin 36. The eccentric portion 45 pivotally engages one end of a link 48, which at the other end engages the pivot pin 39.

The described arrangement, including the eccentrics and links provides a very powerful toggle device generally denoted by numeral 49, Fig. 3, operative in the one direction of rotation of hand grip 42 about the axis of shaft 40, to separate the split ends of ring 32, whereby to expand the ring to permit the block 15 to be turned about the axis of pin 18, and operative in the other direction of rotation of hand grip 42 to force the block downwardly and rigidly to hold it against the annular face of the slide 6.

To alter the effective diameter of ring 32, in order that the toggle clamping device 49 may clamp at the most effective position of the toggle members, and for other reasons, the two members 33, 34 of ring 32 are relatively adjustable by the means of a stud 50, fixed in the ring member 33 and extending through a bore 50a in member 34, the stud carrying a washer 51 having a self-aligning seat on member 34 and adjustable by an elongated nut 52 threaded on the stud 50. The threads of the nut 52 carry a screw 53, which may be set up against the end of the stud 50 to lock the adjustment.

Figure 5:
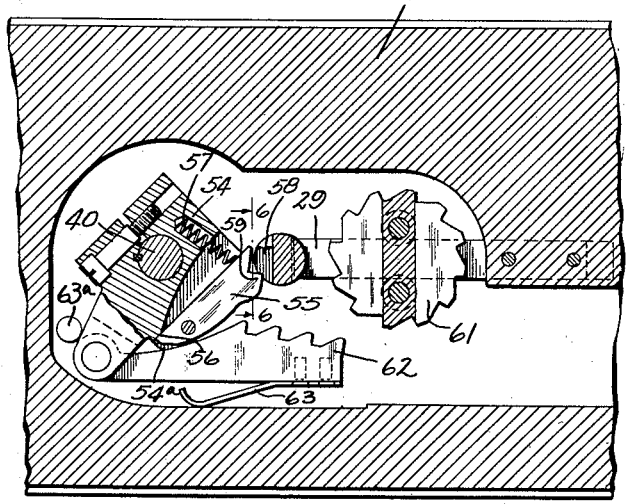
Figure 5 is a partial horizontal section, taken approximately along line 5—5 of Fig. 4.
Figure 6:
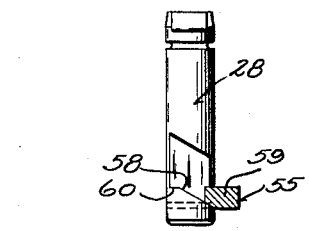
Figure 6 shows an index locating plunger, shown in Figs. 3 and 5, and a portion of an operating latch therefor, viewed from the position 6—6 of Fig. 5.

The lower end of shaft 40 carries means for operating the locating plunger 28, as follows: A member 54 is fixed on shaft and carries a pivoted latch member 55 normally urged against a locating abutment 56 by a spring 57. The plunger 28 is provided with a cam slot 58, Fig. 6, which is engaged by an end portion 59 of the latch. In the clamping position of lever 41, which is the full line position of Fig. 3 the plunger and its operating parts are positioned as shown in Figs. 5, 6. As lever 41 is turned toward the dotted line position, Fig. 3, whereby to unclamp the block 15, the cam portion 59 causes disengagement of the plunger 28 from bushing 27 against the resistance of spring 29, until the lower face of cam portion 59 rides on a locating portion 60 of plunger 28, which establishes the disengaged plunger position.

The described plunger disengagement is completed after the block 15 is fully unclamped, but before the lever 41 has completed its movement in unlocking direction. During the continued movement of the lever in the same direction the block is indexed, by means later described, and at some point prior to the time when the lever reaches the dotted line position shown in Fig. 3, the cam portion 59 has passed completely through cam slot 58 and the plunger 28 is moved upwardly by the spring 29, whereby it enters the next locating bushing 27 as soon as block 15 has rotated sufficiently.

When plunger 28 has entered the bushing 27 in the new position, as described, the hand lever 41 may be returned to block clamping position and during this return movement the latch 55 pivots against the resistance of spring 57 to permit the portion 59 to pass plunger 28 in its return to the position shown in Fig. 5.

For rotating block 15 from lever 41 there is provided a ratchet wheel 61 fixed on the lower end of the pivot pin portion 18 of the block. Ratchet 61 is engaged by a rack dog element 62, pivoted on the member 54 and urged by a spring 63 in a direction for the rack to engage the ratchet as soon as member 54 has rotated sufficiently for the portion 54a to permit of rack engagement. As soon as the locating plunger 28 has reengaged as previously described the plunger prevents further movement of the rack, and of hand lever 41, thus acting as a limiting stop preventing movement of the hand lever past the dotted line position shown in Fig. 3.

Repeating the cycle of movements of the lever 41 as above described will result in a series of index movements to move the tools fixed in the different slots 15a to operating position, one after another. But during movement of lever 41 from the full line to the dotted line position of Fig. 3, and just following the unclamping of the block 15 and the disengagement of plunger 28 there is a position of the mechanism in which the block is free to be turned manually. In this position the lever 41 may be permitted to remain stationary, and block 15 turned to any desired position in either direction by manually grasping and turning the block. Following this it is unnecessary to complete the lever movement to dotted line position, the lever being turned in that direction only far enough to release the plunger 28, and then returned to full line position to clamp the block.

Means are provided for the clamping direction of movement to prevent the toggle 48 from passing through clamping position, and to prevent the hand grip from passing the full line position shown in Fig. 3, consisting of an abutment 63a, Fig. 5, which contacts the member 54, as there shown.

By the means described the hand grip portion of lever 42 is prevented from passing outside the space defined by the edges of cross slide 6 and the operator is therefore fully protected against injury.

A cover 64 is provided to protect the toggle device 49 from chips or other foreign matter, the cover being removably held in position by screws such as 65. A removable cover 66 similarly protects the slot or space provided at the rear for the adjustment of members 33, 34. The covers extend somewhat underneath the edge of the narrowest portion of block 15, as shown in Fig. 2, and to further protect the opposed relatively movable surfaces of block 15, slide 6 and clamp ring 32 against entry of chips or abrasive substances there is provided a ring 67, Fig. 2 of resilient packing material located in an annular groove in block 15 and bearing against the upper surface of ring 32.

What is claimed is:

1. In a machine tool, the combination of a slide guided for horizontal reciprocatory movement, a tool holder supported on said slide for rotary index movement to different positions about a vertical axis, means for accurately defining different of said tool holder positions including a locating member carried by said slide and movable into positions respectively engaging and disengaging said tool holder, a lever pivotally carried by said slide and providing a hand grip portion movable in a substantially horizontal plane, clamp means operable for releasably fixing said tool holder rigidly with said slide, and motion transmitting connections from said lever for the movement of said locating member, for indexing said tool holder and for clamping operation of said clamp means in the order recited.

2. In a machine tool, the combination of a slide having a longitudinal edge, a tool holder supported from said slide for rotary index movement to different positions about a vertical axis, means for accurately defining different of said positions including a locating member carried by said slide and movable into positions respectively engaging and disengaging said tool holder, a lever pivotally carried by said slide and providing a hand grip portion movable in a substantially horizontal plane, clamp means operable for releasably rigidly fixing the position of rotation of said tool holder, motion transmitting connections from said lever for movement of said locating member, for rotating said tool holder, and for clamping operation of said clamp means in the order recited, and means limiting the movement of said lever to prevent movement of said hand grip portion thereof past the edge of said slide.

3. In a machine tool, the combination of a slide guided for horizontal reciprocation, a tool holder supported from said slide for rotary index movement to different positions about a vertical axis, means for accurately defining different of said tool holder positions, a lever pivotally carried by said slide and providing a hand grip portion movable in a substantially horizontal plane, clamp means operable for releasably rigidly fixing the position of rotation of said tool holder, and motion transmitting connections from said lever for indexing said tool holder and for clamping operation of said clamp means respectively during different directions of movement of said lever about its pivot.

4. In a machine tool, the combination of a slide guided for horizontal reciprocatory movement and having a longitudinal edge substantially parallel with the path of movement of the slide, a tool holder supported on said slide for rotary index movement to different positions about a vertical axis, means for accurately defining different of said tool holder positions, a lever pivotally carried by said slide and providing a hand grip portion movable in a substantially horizontal plane, clamp means operable for releasably fixing said tool holder rigidly with said slide, motion transmitting connections from said lever for indexing said tool holder and for clamping operation of said clamp means respectively during opposite directions of movement of said lever about its pivot, and means limiting the movement of said lever to prevent movement of the hand grip portion thereof past said edge.

5. In a machine tool the combination of a slide guided for horizontal reciprocatory movement and having longitudinal edges spaced apart, a tool holder supported on said slide for rotary index movement to different positions about a vertical axis, means for accurately locating different of said tool holder positions including a member carried by said slide and movable into positions respectively engaging and disengaged from said tool holder, clamp means operable for releasably fixing said tool holder rigidly with said slide, a lever carried by said slide for movement about a substantially vertical axis, said lever including a hand grip portion movable between said edges, motion transmitting connections from said lever for indexing said tool holder and for clamping operation of said clamp means respectively in opposite directions of movement of said lever about its pivot, and means restricting the movement of said lever to prevent movement of said hand grip portion past either of said edges.

6. In a machine tool the combination of a slide guided for horizontal reciprocatory movement and having a longitudinal edge, a tool holder supported on said slide for rotary index movement to different positions about a vertical axis, means for accurately locating different of said tool holder positions including a member carried by said slide and movable into positions respectively engaging and disengaged from said tool holder, clamp means operable for releasably fixing said tool holder rigidly with said slide, a lever carried by said slide for movement about a substantially vertical axis, said lever including a hand grip portion, motion transmitting connections from said lever for movement of said member, for indexing of said tool holder, and for clamping operation of said clamp means in the order recited during a forward and reverse movement of said lever about its pivot, and means restricting the movement of said lever to prevent movement of said hand grip portion past said longitudinal edge of the slide.

7. In a machine tool, the combination of a slide guided for horizontal reciprocatory movement and having a longitudinal edge, means for reciprocation of said slide including a hand wheel pivoted adjacent one end of said slide and on an axis parallel to the direction of slide movement, a tool holder supported on said slide adjacent the other end thereof for rotary index movement to different positions about a vertical axis, means for accurately locating different of said tool holder positions including a member carried by said slide and movable into positions respectively engaging and disengaged from said tool holder, clamp means operable for releasably rigidly fixing said tool holder with said slide, a pivoted lever carried by said slide and including a hand grip portion positioned between said hand wheel and tool holder, said hand grip portion being movable in directions toward and from said edge, motion transmitting connections from said lever for disengaging said member and indexing said tool holder, and for clamping movement of said clamp means in the order recited, and means limiting the pivotal movement of said hand grip portion to prevent movement thereof past said edge.

8. In a machine tool, the combination of a slide guided for horizontal reciprocatory movement and having a longitudinal edge, means for reciprocation of said slide including a hand wheel pivoted adjacent one end of said slide, a tool holder supported on said slide adjacent the other end thereof for rotary index movement to different positions about a vertical axis, means for accurately locating different of said tool holder positions including a member carried by said slide and movable into positions respectively engaging and disengaged from said tool holder, clamp means operable for releasably rigidly fixing said tool holder with said slide, a pivoted lever carried by said slide and including a hand grip portion positioned between said hand wheel and tool holder, said hand grip portion being movable in directions toward and from said edge, motion transmitting connections from said lever for disengaging said member and subsequently substantially simultaneously adjusting said clamp means to unclamping position and indexing said tool holder during one direction of movement of said lever about its pivot, and for adjusting said clamp means to clamping position during opposite direction of movement of said lever, and means limiting the pivotal movement of said hand grip portion to prevent movement thereof past said edge.

9. In a machine tool one base member and a member supported thereon for rotary index movement to a plurality of different operating positions, said indexible member and base member having opposed abutting clamp surfaces, an expandable and contractible ring member having portions respectively engaging said base and index member on opposite sides of the plane of said abutting surfaces, said indexible member and base having annular surfaces co-operative with surfaces of said ring member to frictionally clamp said abutting surfaces during contraction of said ring member, an index plunger movable in opposite directions respectively to engage and to disengage said indexible member and providing a cam groove disposed at an angle relative to the direction of plunger movement, spring means continuously urging said plunger in engaging direction, a shaft adjacent said plunger and axially parallel with the direction of plunger movement, a motion transmitting connection from said shaft for the expansion and contraction of said ring member respectively during opposite oscillation of said shaft, a cam follower element oscillatable with said shaft and engaging said cam groove to disengage said plunger during oscillation of said shaft in a direction to expand said ring member, and a ratchet connection from said shaft for indexing said indexible member during shaft oscillation in the last mentioned direction, said follower element being pivotally mounted to pass said plunger during oscillation of said shaft in the direction opposite to said last mentioned direction.

10. In a machine tool the combination of a base, a tool holder supported from said base for rotary index movement, said base and tool holder providing opposed abutting clamp surfaces, an annular expansible and contractible ring member engaging said tool holder and slide respectively above and below said abutting surfaces, said tool holder and base having annular surfaces cooperating with complementary surfaces of said ring member to frictionally engage said abutting surfaces during ring contraction, an index plunger movable in opposite directions respectively to engage and disengage said tool holder and providing a cam surface disposed at an angle relative to the direction of plunger movement, means continuously urging said plunger in engaged direction, a shaft oscillatable adjacent said plunger, a motion transmitting connection for oscillation of said shaft in different directions respectively during expansion and contraction of said ring member, a cam follower element oscillatable with said shaft to engage said cam groove whereby to disengage said plunger during expansion of said ring member, said cam element being pivoted to pass said plunger during contraction of said ring member, means normally continuously urging said cam element in a direction to engage said cam surface, and a connection from said shaft for indexing said tool holder during said oscillatory shaft movement.

11. In a machine tool the combination of a base, a tool holder supported from said base for rotary index movement, clamp means movable in opposite directions respectively to release and to clamp said tool holder and base, an index plunger movable in opposite directions to positions respectively engaging and disengaging said tool holder and providing a cam surface disposed at an angle relative to the direction of movement of said plunger, means continuously urging said plunger in a direction to engage the tool holder, a shaft oscillatable adjacent said plunger, a motion transmitting connection for oscillation of said shaft in different directions respectively during the different direction of movement of said clamp means, a cam follower element oscillatable with said shaft and engaging said cam surface to disengage said index plunger during the releasing movement of said clamp means, said cam element being pivotally mounted whereby to pass said plunger during the clamping direction of movement, means normally continuously urging said cam element in a direction to engage said cam surface, and a ratchet connection from said shaft for indexing said tool holder during said oscillatory shaft movement.

12. In a machine tool the combination of a base member and a member supported therefrom for rotary index movement to a plurality of different operating positions, clamp means movable to positions respectively releasing said indexible member for index movement and rigidly fixing said indexible member with said base, a lever movable in opposite directions, a motion transmitting connection from said lever for effecting said different positions of said clamp means respectively from the opposite directions of lever movement, locating means including a member carried by said base and oppositely movable into different positions respectively engaging and disengaging said indexible member, means continuously urging said locating member toward said position of engagement, and a motion transmitting connection from said lever effective to shift said locating member into its disengaged position during a first portion of the movement of said lever in the direction to effect said releasing position of the clamp means and later during the same direction of lever movement to release said locating member for engagement by said urging means and substantially simultaneously to index said indexible member.

13. In a machine tool the combination of a base member and a member supported therefrom for rotary index movement to a plurality of different operating positions, clamp means movable to positions respectively releasing said indexible member for index movement and rigidly fixing said indexible member with said base, a lever movable in opposite directions, a motion transmitting connection from said lever for effecting said different positions of said clamp means respectively from the opposite direction of lever movement, locating means including a member carried by said base and oppositely movable into different positions respectively engaging and disengaging said indexible member, means continuously urging said locating member toward position of engagement, and a motion transmitting connection from said lever effective to shift said locating member into its disengaged position during a first portion of the movement of said lever in the direction to effect said releasing position of the clamp means and later during the same direction of lever movement to release said locating member for engagement by said urging means and substantially simultaneously to index said indexible member, the last mentioned connection being inoperative to shift said locating member during the opposite direction of movement of said lever.

14. In a machine tool the combination of a base, a tool holder supported from said base for rotary index movements, clamp means movable to different positions respectively for releasing said tool holder for index rotation and for clamping said tool holder rigidly with said base, locating means for defining successive positions of said tool holder including a plunger movable into and out of locating engagement with said tool holder in each of said successive positions, a pivoted hand lever, a motion transmitting connection from said hand lever to effect the different positions of said clamp means respectively from the different directions of movement of said lever, and motion transmitting connections from said lever for effecting the disengaged position of said plunger and indexing said tool holder during lever movement in the direction effecting the position of said clamp means releasing said tool holder, the last mentioned connection being adapted to free said plunger for tool holder engagement during continued movement of said lever in the last mentioned direction.

15. In a machine tool the combination of a slide guided for horizontal reciprocation and having a longitudinal edge, a tool holder supported from said slide for rotary index movements about a vertical axis, said tool holder being carried by said slide for unitary bodily movement therewith, clamp means movable to different positions respectively for releasing said tool holder for index rotation and for clamping said tool holder rigidly with said slide, locating means for defining successive positions of said tool holder including a plunger movable into and out of locating engagement with said tool holder in each of said successive positions, a hand lever pivoted on said slide and providing a hand grip portion movable toward and from said edge, a motion transmitting connection from said hand lever to effect the different positions of said clamp means respectively from the different directions of movement of said lever, motion transmitting connections from said lever for effecting the disengaged position of said plunger and indexing said tool holder during lever movement in the direction effecting the position of said clamp means releasing said tool holder, the last mentioned connection being adapted to free said plunger for tool holder engagement during continued movement of said lever in the last mentioned direction, and means limiting the movement of said lever to prevent movement of said hand grip portion past said edge.

16. In a machine tool, the combination of an indexible turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, means for oscillation of said shaft, a cam follower member carried by said shaft to engage said groove and cooperate therewith to withdraw said plunger during oscillation of said shaft in the one direction, means yieldably mounting said follower member to pass the plunger without plunger movement during shaft oscillation in the other direction and ratchet means connecting said shaft for indexing said turret.

17. In a machine tool, the combination of an indexible turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexible turret, means connecting said shaft for operation of said clamp means and means connecting said shaft for indexing said turret.

18. In a machine tool, the combination of an indexible turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexible turret, means connecting said shaft and clamp means for releasing said indexible turret during oscillation of said shaft in the direction first mentioned and for clamping said turret during shaft oscillation in said other direction, and means connecting said shaft for indexing said turret during shaft movement in said first mentioned direction.

19. In a machine tool, the combination of an indexible turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexible turret, means connecting said shaft for operation of said clamp means, means connecting said shaft for indexing said turret, said lever providing an exposed hand grip portion, and means limiting the oscillation of said shaft whereby to limit the movement of said hand grip portion to prevent movement thereof outside the space defined between two spaced planes each parallel with the turret axis and respectively coinciding with opposite edges of said turret.

20. In a machine tool the combination of a base member and a member supported therefrom for rotary index movement to a plurality of different operating positions, clamp means movable to positions respectively releasing said indexible member for index movement and rigidly fixing said indexible member with said base, a lever movable in opposite directions, a motion transmitting connection from said lever for effecting said different positions of said clamp means from the opposite directions of lever movement, locating means including a member carried by said base and oppositely movable into different positions respectively engaging and disengaging said indexible member, means continuously urging said locating member toward said position of engagement, and a motion transmitting connection from said lever effective to shift said locating member into its disengaged position during a first portion of the movement of said lever in the direction to effect said releasing position of the clamp means and later during the same direction of lever movement to release said locating member for engagement by said urging means and substantially simultaneously to index said indexible member, said motion transmitting connections being effective at an intermediate position of said lever to effect a simultaneous disengaged position of said locating member and released position of said clamp means, whereby to permit manual indexing of said indexible member independently of the continued lever movement.

21. In a machine tool, the combination of an indexible turret, a locating plunger reciprocable in a direction parallel with the turret axis, said turret providing spaced sockets respectively engageable by said plunger in different indexed turret positions, spring means urging said plunger in a direction to engage said sockets, a shaft supported for oscillation adjacent said plunger and axially parallel with the turret axis, said plunger providing a cam groove on the side in the direction of said shaft and angularly disposed relative to the plane transverse to the direction of plunger movement, a lever fixed on said shaft for manual oscillation thereof, a cam follower member carried by said shaft to engage said cam groove and withdraw said plunger during shaft oscillation in the one direction, means yieldably mounting said follower member to pass said plunger without plunger movement during shaft oscillation in the other direction, clamp means for said indexible turret, means connecting said shaft for operation of said clamp means and means connecting said shaft for indexing said turret, the relationship of said cam groove, clamp means operating connection and indexing connection providing a position of said shaft during oscillation in the first mentioned direction effecting simultaneous disengagement of said plunger and unclamped position of said clamp means prior to the operation of said indexing connection.

22. In a machine tool, the combination of a slide guided for horizontal reciprocatory movement, means for said slide movement including a manually operable member pivoted adjacent one end of the slide, a tool holder supported on said slide adjacent the other end thereof for rotary index movement to different positions about a vertical axis, means for accurately defining different of said tool holder positions including a locating member carried by said slide and movable into positions respectively engaging and disengaging said tool holder, a lever pivotally carried by said slide and providing a hand grip portion movable in a zone immediately above said slide and longitudinally between said manually operable member and said tool holder in a substantially horizontal plane, clamp means operable for releasably fixing said tool holder rigidly with said slide, and motion transmitting connections from said lever for the movement of said locating member, for indexing said tool holder and for clamping operation of said clamp means in the order recited.

WERNER IRVING SENGER.